US008799158B2

United States Patent
Mathew

(10) Patent No.: US 8,799,158 B2
(45) Date of Patent: Aug. 5, 2014

(54) AUTOMATED BILL VALIDATION FOR ELECTRONIC AND TELEPHONIC TRANSACTIONS

(75) Inventor: George Mathew, Kerala State (IN)

(73) Assignee: KYOCERA Corporation, Kyoto (JP)

( * ) Notice: Subject to any disclaimer, the term of this patent is extended or adjusted under 35 U.S.C. 154(b) by 1102 days.

(21) Appl. No.: 11/678,510

(22) Filed: Feb. 23, 2007

(65) Prior Publication Data

US 2008/0208738 A1    Aug. 28, 2008

(51) Int. Cl.
*G06Q 20/10* (2012.01)

(52) U.S. Cl.
USPC .............................................. 705/40; 705/42

(58) Field of Classification Search
USPC .......................................................... 705/40
See application file for complete search history.

(56) References Cited

U.S. PATENT DOCUMENTS

| | | | | |
|---|---|---|---|---|
| 5,325,418 | A * | 6/1994 | McGregor et al. | ............ 455/408 |
| 5,517,549 | A | 5/1996 | Lee | |
| 5,519,769 | A | 5/1996 | Weinberger et al. | |
| 6,327,350 | B1 * | 12/2001 | Spangler et al. | ......... 379/115.01 |
| 6,456,706 | B1 | 9/2002 | Blood et al. | |
| 7,136,469 | B1 * | 11/2006 | Ravindranath et al. | .. 379/114.01 |
| 7,245,901 | B2 * | 7/2007 | McGregor et al. | ............ 455/406 |
| 7,280,652 | B2 * | 10/2007 | Bocking et al. | .......... 379/355.02 |
| 7,373,136 | B2 * | 5/2008 | Watler et al. | ................... 455/405 |
| 2004/0097220 | A1 * | 5/2004 | McGregor et al. | ............ 455/419 |
| 2006/0235798 | A1 * | 10/2006 | Alkove et al. | ................... 705/59 |

OTHER PUBLICATIONS

Internet document: NTT DoCoMo "Osaifu-Keitai" at http://www.nttdocomo.co.jp/english/service/innode/osaifu/index.html (accessed Feb. 23, 2007).

* cited by examiner

*Primary Examiner* — Lindsay M. Maguire

(57) ABSTRACT

The present invention is directed to verifying information related to one or more transactions using an electronic or telephonic medium, for example. In operation, a user of the electronic or telephonic medium makes phone calls, uses bandwidth or data, or purchases items. Information associated with the transactions is sent to a default location and stored in a data storage location, such as a data storage location. Tariff information associated with the transactions may also be stored in the data storage location. The tariff information and the information related to the transactions themselves are used to generate a first bill. At the end of a time period a second bill is received from the service provider associated with the electronic or telephonic medium. The first bill is cross-verified against the second bill. If any discrepancies are found the user and/or the service provider is notified.

18 Claims, 7 Drawing Sheets

AUTOMATED BILL VALIDATION FOR ELECTRONIC AND TELEPHONIC TRANSACTIONS

FIELD OF THE INVENTION

The present invention relates generally to electronic and telephonic transactions, and more specifically to validating bills and/or expenses related to the electronic and telephonic transactions in an automated manner.

BACKGROUND

With the emergence of online, electronic and phone-based transactions it has become difficult to verify all of the transactions a consumer has made each month to determine, for example, if the consumer was overcharged by their service provider for one or more of the transactions. For example, when a person uses a cellular phone, they may make a number of calls to a number of locations. Each of the locations may be widely dispersed geographically, and as such may have different tariff information and/or costs associated with each call.

It is difficult for the user to know what those tariffs and costs are, if they are applicable to certain calls, and if wrong and/or inflated information about the costs is being presented on their bill at the end of each month. For example, a call from Los Angeles to New York for one hour in the evening may have a different cost associated with the call than a call from Los Angeles to New York during the day. Similarly a call from Los Angeles to New York may differ in price from a call between San Francisco and New Jersey.

Likewise, a user who purchases items electronically, either via a cellular phone, personal digital assistant ("PDA"), smartcard or the like has a similar problem because the number of transactions can become numerous and the user may forget the exact prices and/or tariffs associated with each transaction. Therefore, the user who purchases items electronically may also be unable to ensure that the charges presented to them at the end of the month are accurate or inflated.

Making matters even more difficult, the user may not only forget what the tariffs were with regard to each transaction, but at the time the service provider presents the bill the user may not have any information whatsoever about the basis for the tariff information, which would be needed to verify whether the bill is accurate or inflated.

SUMMARY

The present invention is directed to verifying information related to one or more transactions using a medium. The medium may be an electronic or telephonic medium, for example. In operation, a user of the electronic or telephonic medium performs one or more transactions, including making phone calls, using bandwidth or data, or purchasing items. Information associated with the transactions is sent to a default location and converted to a standard format, if necessary, so that it can be stored in a data storage location such as a database.

Tariff information associated with the transactions may also be stored in the data storage location. The tariff information and the information related to the transactions themselves are used to generate a first bill. At the end of a time period, typically each month, a second bill is received from the service provider associated with the electronic or telephonic medium. The first bill is cross-verified against the second bill. If any discrepancies are found the user and/or the service provider may be notified so that the user is not overcharged.

If the tariff information changes, the data storage location can be updated. The data storage location typically resides in a remote location such as a server. There is a communicative coupling between the server and the medium. If the communicative coupling is ever disrupted, (e.g., the user loses a connection to the server), a local data storage location may be used to store the data until the communicative coupling is restored. Once the communicative coupling is restored, the information may be uploaded from the local data storage location to the remote data storage location.

The electronic and/or the telephonic medium may include, for example, a cellular phone, a land phone, a PDA, a smart phone, a computing device, or a smartcard.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts.

DETAILED DESCRIPTION

Certain embodiments as disclosed herein provide for verifying information related to one or more transactions using a medium such as an electronic or telephonic medium. In operation, a user of the medium performs one or more transactions, including making phone calls, using bandwidth or data, or purchasing items. Information associated with the transactions is sent to a default location, such as a database. Tariff information associated with the transactions may also be included in the database and used to generate a first bill. At the end of a time period, a second bill is received. The first bill is cross-verified against the second bill. If any discrepancies are found the user and/or the service provider may be notified.

For example, one method as disclosed herein allows for a user to cross-verify over the air calls made with a cellular phone to various locations during the month. Another method disclosed herein allows the user to cross-verify data usage or bandwidth usage from a networked computing device. Still another method disclosed herein allows the user to cross-verify transactions that include, for example, the purchase of items via an over the air connection using a device such as a smartcard or a smart phone.

Those of skill will further appreciate that the various illustrative logical blocks, modules, circuits, and algorithm steps described in connection with the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit without departing from the invention.

After reading this description it will become apparent to one skilled in the art how to implement the invention in various alternative embodiments and alternative applications. However, although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

Figure 1:
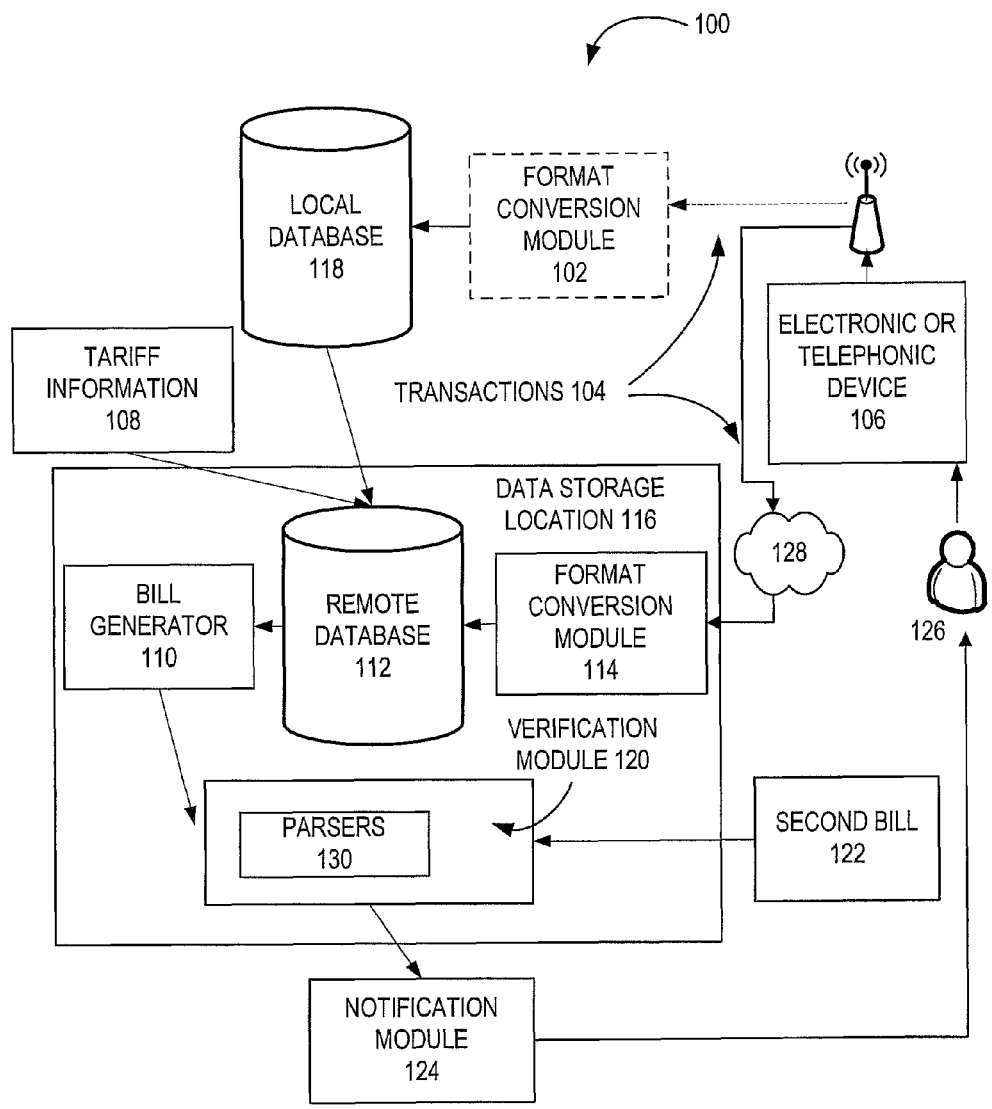
FIG. 1 is a block diagram illustrating an example system configured for automated bill validation for electronic and telephonic transactions according to an embodiment of the present invention.

Referring now to the Figures, FIG. 1 is a block diagram illustrating an example system configured for automated bill validation for electronic and telephonic transactions according to an embodiment of the present invention. In the illustrated embodiment, a system 100 is configured for automated bill validation for electronic and telephonic transactions. The system 100 includes an electronic or telephonic device 106, a user 126, standard format conversion modules 102 and 114, a data storage location 116, transactions 104, a local database 118, a remote database 112, tariff information 108, a bill generator 110, a bill verification module 120, parsers 130, a second bill 122, a network 128, and a discrepancy notifier 124.

The user 126 is an individual, presumably the owner of the electronic or telephonic device 106, or a person who has permission to use the electronic or telephonic device 106 to perform transactions. The electronic or telephonic device 106 may be any device capable of communicating and or using the network 128. For example, the electronic or telephonic device 106 may be a cellular phone, a land phone, a PDA, a computing device, a smart phone, or a smartcard, which may use the network 128 in the form of a wireless and/or a wired network.

The transactions 104 occur when the electronic or telephonic device 106 is used. For example, one of the transactions 104 may occur when the user 126 uses a cellular phone to make a call from Los Angeles to New York. Likewise, the electronic or telephonic device 106 may be a laptop computer and the user 126 may be communicatively coupled to a wireless Internet connection and may download files from a remote location resulting in a transaction related to the use of bandwidth and/or data.

The standard format conversion modules 102 and 114 may be processes implemented in software, hardware, firmware, or the like. The standard format conversion modules 102 and 114 are designed to put the transactions 104 in a format suitable for storage in a data storage location such as the local database 112 or the remote database 118 in the data storage location 116. For example, the standard format conversion modules 102 and 114 may arrange the data in a row and column format suitable for a typical relational database or in the format of a report.

In operation, the system 100 will typically use the data storage location 116 if the network 128 is operational. The data storage location 116 may reside, for example, on a remote server. The network 128 may be, for example, a wired, over the air, or other network, such as the Internet. If the network 128 is operational, the transactions 104 are stored in the remote database 118. If the network 128 becomes non operational, the local database 112 is used until such time as the network 128 becomes operational again, at which time the transactions 104 are uploaded to the remote database 118. Therefore, the dotted line between the standard format conversion modules 102 and the electronic or telephonic device 106 represents a path for the transaction related information that may not be used unless there is a disruption in the communicative coupling between the standard format conversion modules 114 and the electronic or telephonic device 106.

The tariff information 108 is communicatively coupled to the remote database 118 and is used to periodically update the remote database 118 with up to date tariff information. For example, if the cost for bandwidth usage, data usage, or the tax or fee associated with certain calls to certain areas changes, that change is propagated to the remote database 118.

Periodically, for example at the end of each month, the up to date tariff information 108 and the transactions 104 are used to generate a first bill using the bill generator 110. At the end of another time period, typically each month and typically coordinated with the generation of the first bill by the bill generator 110, the second bill 122 is received. The second bill 122 may be received, for example, from the service provider associated with the electronic or telephonic medium, such as the cellular phone provider or the network access provider. In another embodiment, the user 126 may view a detailed bill at any time.

The first bill is cross-verified against the second bill using the bill verification module 120. To that end, the bill verifier may contain a number of parsers 130. Since many of the service providers use preparatory formats for exchanging and storing billing information, a separate parser may be stored or made available for each of the different telecommunications service providers. Once the parsers 130 are used to perform cross verification, the discrepancy notifier 124 may be used to notify the user 126 and/or the service provider if discrepancies are found. Therefore, through the use of the system 100 of FIG. 1, the user 126 is assisted in making sure that he/she is not paying extra money to the service provider.

Figure 2:
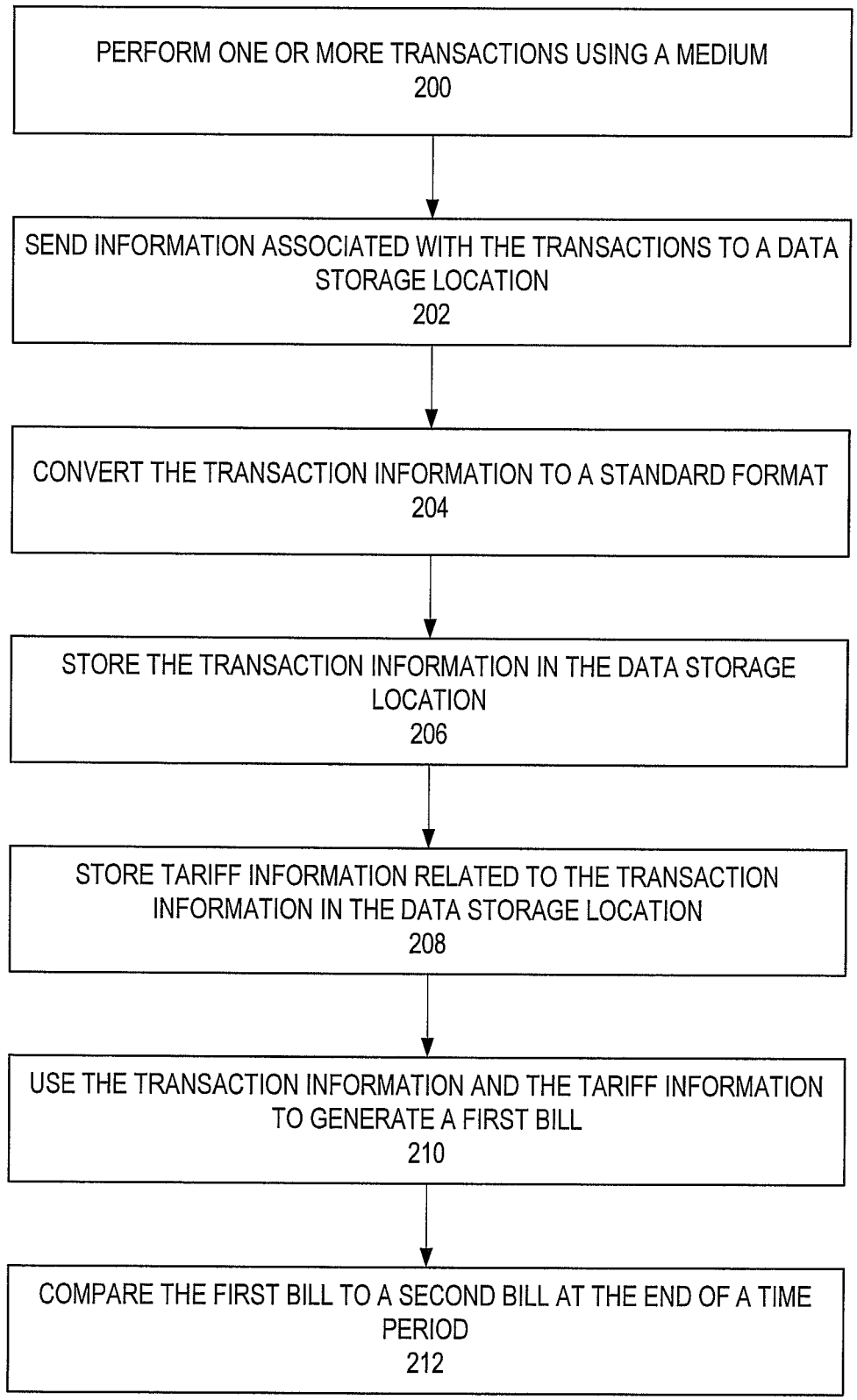
FIG. 2 is a diagram illustrating an example process for automated bill validation for electronic and telephonic transactions according to an embodiment of the present invention.

FIG. 2 is a diagram illustrating an example process for automated bill validation for electronic and telephonic transactions according to an embodiment of the present invention. This process can be carried out by the system 100 previously described with respect to FIG. 1. One or more transactions are performed using an electronic or telephonic medium at step 200. The transactions may be performed, for example, by the user 126 of FIG. 1. At step 202, transaction information associated with the transactions is sent to a data storage location. The data storage location may be, for example, a remote database residing on a server. At step 204, the transaction information is converted to a standard format, such as the form of a report or in a row and column format suitable for a relational database.

At step 206, the transaction information is stored in the data storage location. At step 208, tariff information related to the transaction information is stored in the data storage location. At step 210 the transaction information and the tariff information is used to generate a first bill. At step 212 the first bill is compared to a second bill at the end of a time period 212. The second bill may be, for example, from the service provider. The step 212, therefore, produces an output of the comparison that can be used, for example, to determine whether the user is being overcharged for the services obtained.

Figure 3:
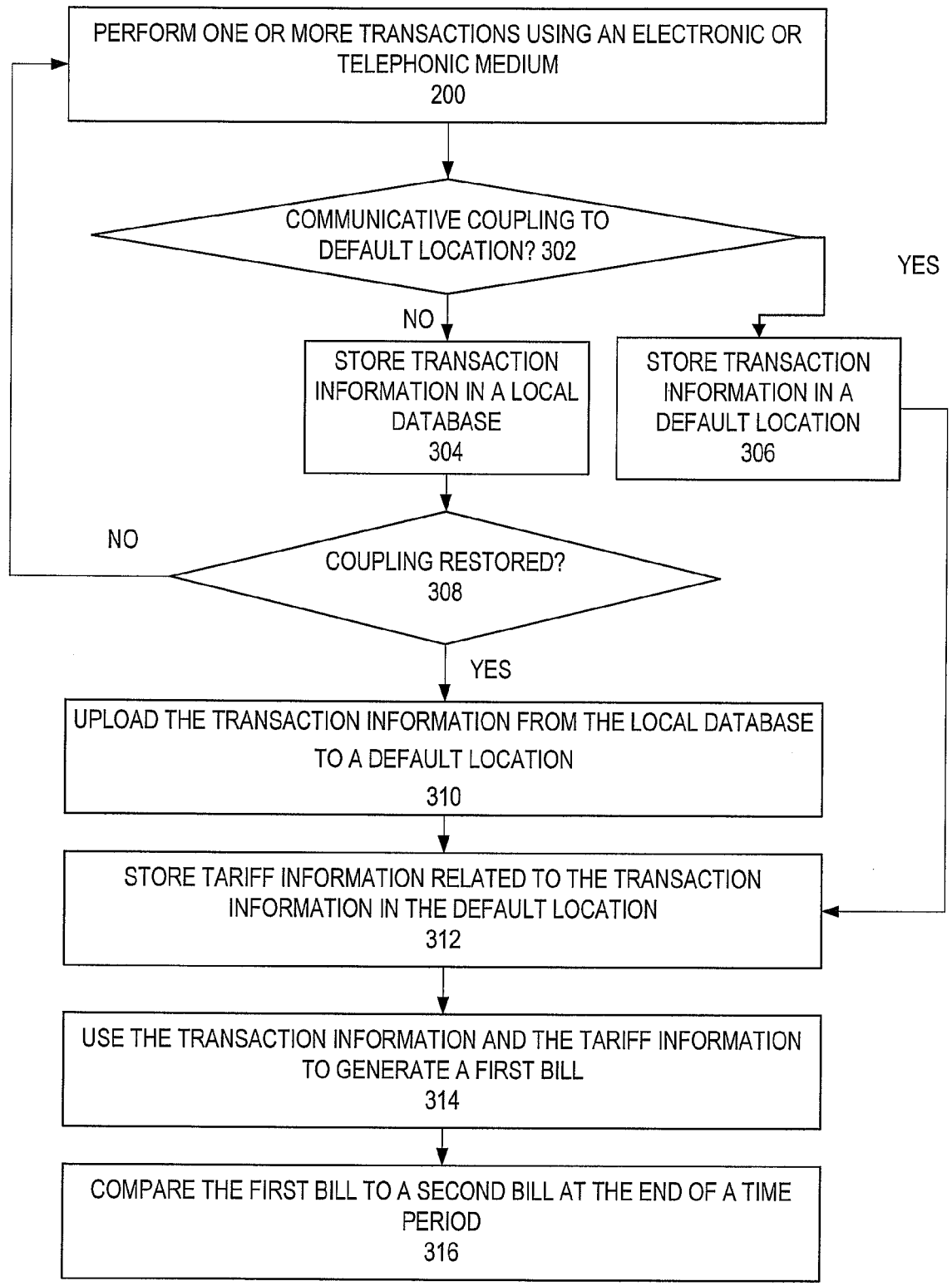
FIG. 3 is a diagram illustrating an example process for automated bill validation for electronic and telephonic transactions according to an embodiment of the present invention.

FIG. 3 is a diagram illustrating an example process for automated bill validation for electronic and telephonic transactions according to an embodiment of the present invention. This process can be carried out by the system 100 previously described with respect to FIG. 1. One or more transactions are performed using an electronic or telephonic medium at step 200. At step 302, it is determined whether a communicative coupling exists to a default location. The communicative coupling may be a connection, for example the network connection 128 of FIG. 1, which may be a wired, over the air, or other connection If the communicative coupling is disrupted at step 302, meaning, for example, that the user cannot use the electronic or telephonic medium to access the network, then the transaction information is stored in a local database at step 304. The local database may reside, for example in a memory area of the electronic or telephonic medium itself, such as a random access memory ("RAM"), a read only memory ("ROM"), a flash memory, a hard drive, etc. At step 308, it is determined whether the communicative coupling has been restored. If not, step 200 repeats, wherein the user may continue to use the device and the data may continue to be stored locally.

If the connection to a default location exists at step 302, then the transaction information is stored in a default storage location at step 306. The default storage location 306 may be, for example, a database that resides on a remote server. If and when the communicative coupling is restored at step 308, the transaction information is uploaded from the local database to the remote storage location at step 310. Therefore, after step 310 or after step 306 all of the transaction related information should be stored at the remote storage location, at which time tariff related information is also stored in the remote storage location at step 312.

At step 314, the information related to the transactions as well as the tariff related information is used to generate a first bill. Thereafter, at step 316 the first bill is compared to a second bill at the end of a time period. The step 316, therefore, produces an output of the comparison that can be used, for example, to determine whether the user is being overcharged for the services obtained.

Figure 4:
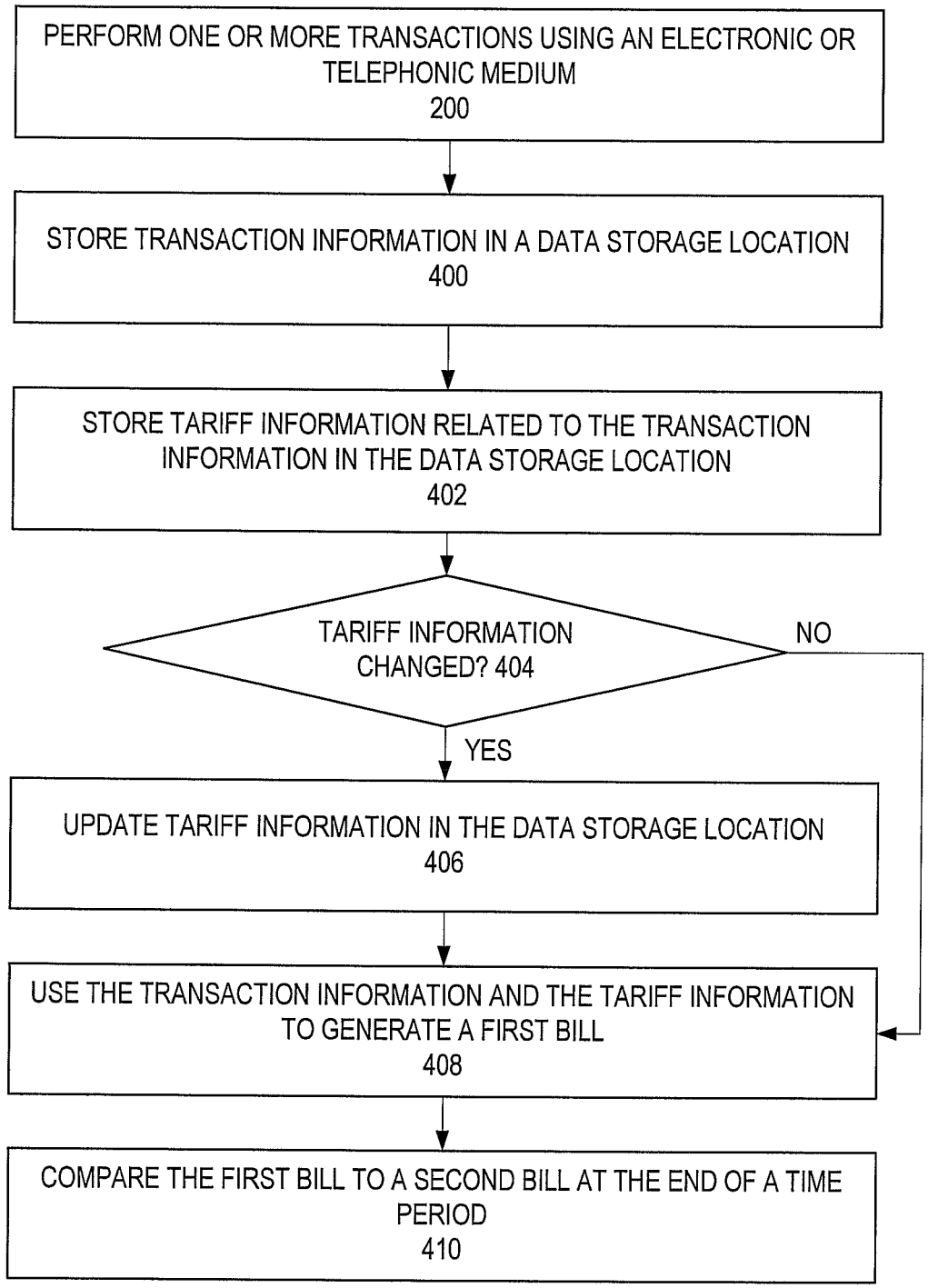
FIG. 4 is a diagram illustrating an example process for automated bill validation for electronic and telephonic transactions according to an embodiment of the present invention.

FIG. 4 is a diagram illustrating an example process for automated bill validation for electronic and telephonic transactions according to an embodiment of the present invention. This process can be carried out by the system 100 previously described with respect to FIG. 1. One or more transactions are performed using an electronic or telephonic medium at step 200. At step 400, the transaction information related to the electronic or telephonic transactions is stored in a data storage location. The data storage location may be, for example, the local database 118 or the remote database 118 of FIG. 1.

At step 402, tariff information is stored in the data storage location. The tariff information may be information associated with the stored information about the transactions. At step 404, it is determined whether the tariff information has changed. The tariff information may change, for example, when the service provider changes their rates, changes the way rates are calculated, or for any other reason.

If the tariff information has changed, then at step 406 the data storage location is updated with the changed tariff information. Thereafter, or if the tariff information has not changed at step 406, the information related to the transactions and the tariff related information is used to generate a first bill at step 408. Then, at step 410 the first bill is compared to a second bill. The step 410, therefore, produces an output of the comparison that can be used, for example, to determine whether the user is being overcharged for the services obtained.

Figure 5:
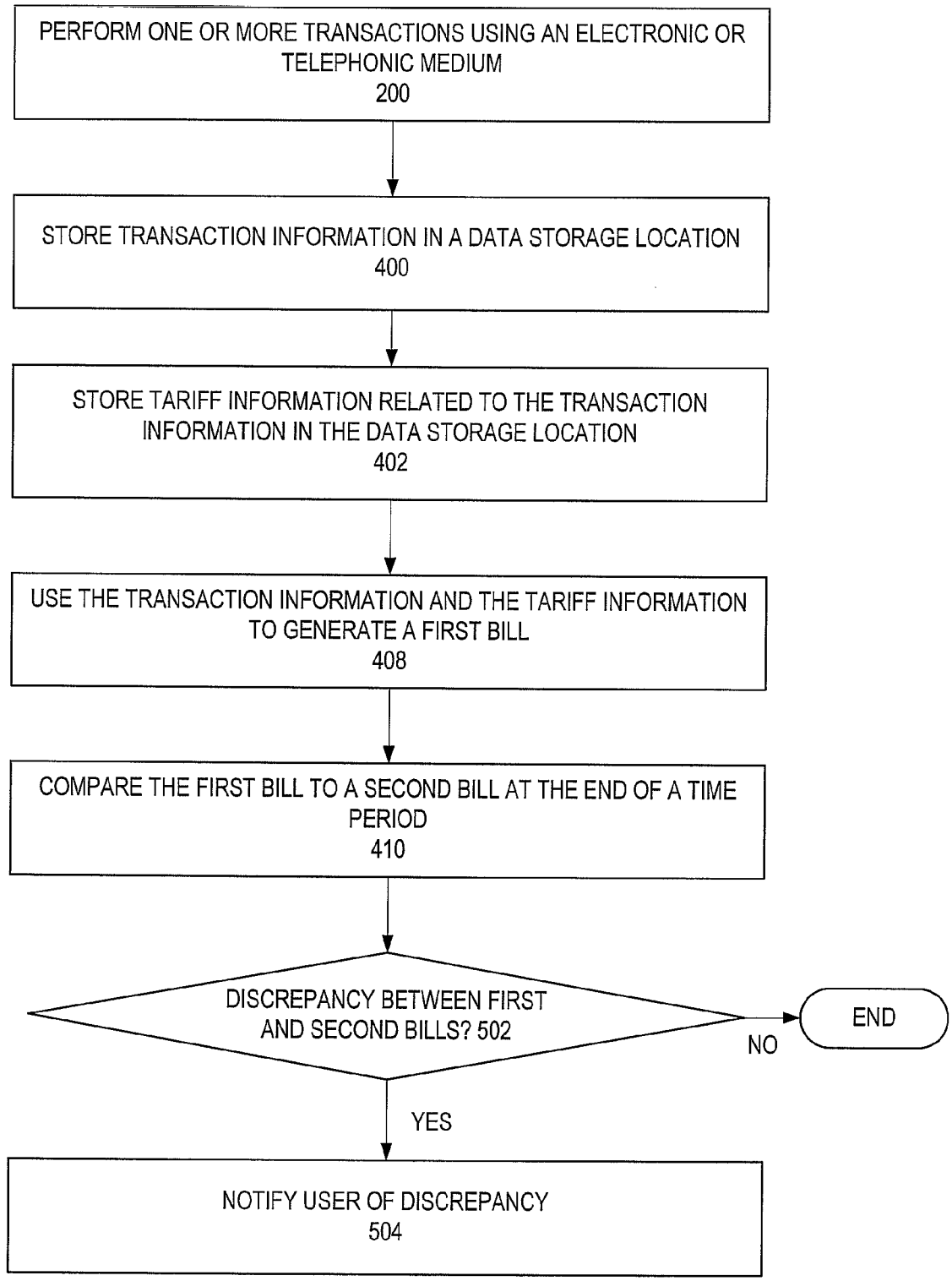
FIG. 5 is a diagram illustrating an example process for automated bill validation for electronic and telephonic transactions according to an embodiment of the present invention.

FIG. 5 is a diagram illustrating an example process for automated bill validation for electronic and telephonic transactions according to an embodiment of the present invention. This process can be carried out by the system 100 previously described with respect to FIG. 1. One or more transactions are performed using an electronic or telephonic medium at step 200. At step 400, the information related to the electronic or telephonic transactions is stored in a data storage location. At step 402, tariff information is stored in the data storage location. At step 408, the information related to the transactions and the tariff related information is used to generate a first. Then, at step 410 the first bill is compared to a second bill.

At step 502, it is determined whether there is a discrepancy between the first and the second bills. For example, the second bill may have entries that are greater than the entries in the first bill, meaning the service provider likely overcharged the user 126. If there are not discrepancies then the process ends since the service provider did in fact present a true and accurate bill. If, on the other hand, there is a discrepancy between the first and second bills then at step 504, the user is notified of the discrepancy. The user can then take corrective actions, such as contacting the service provider and obtaining a refund, for example.

Figure 6:
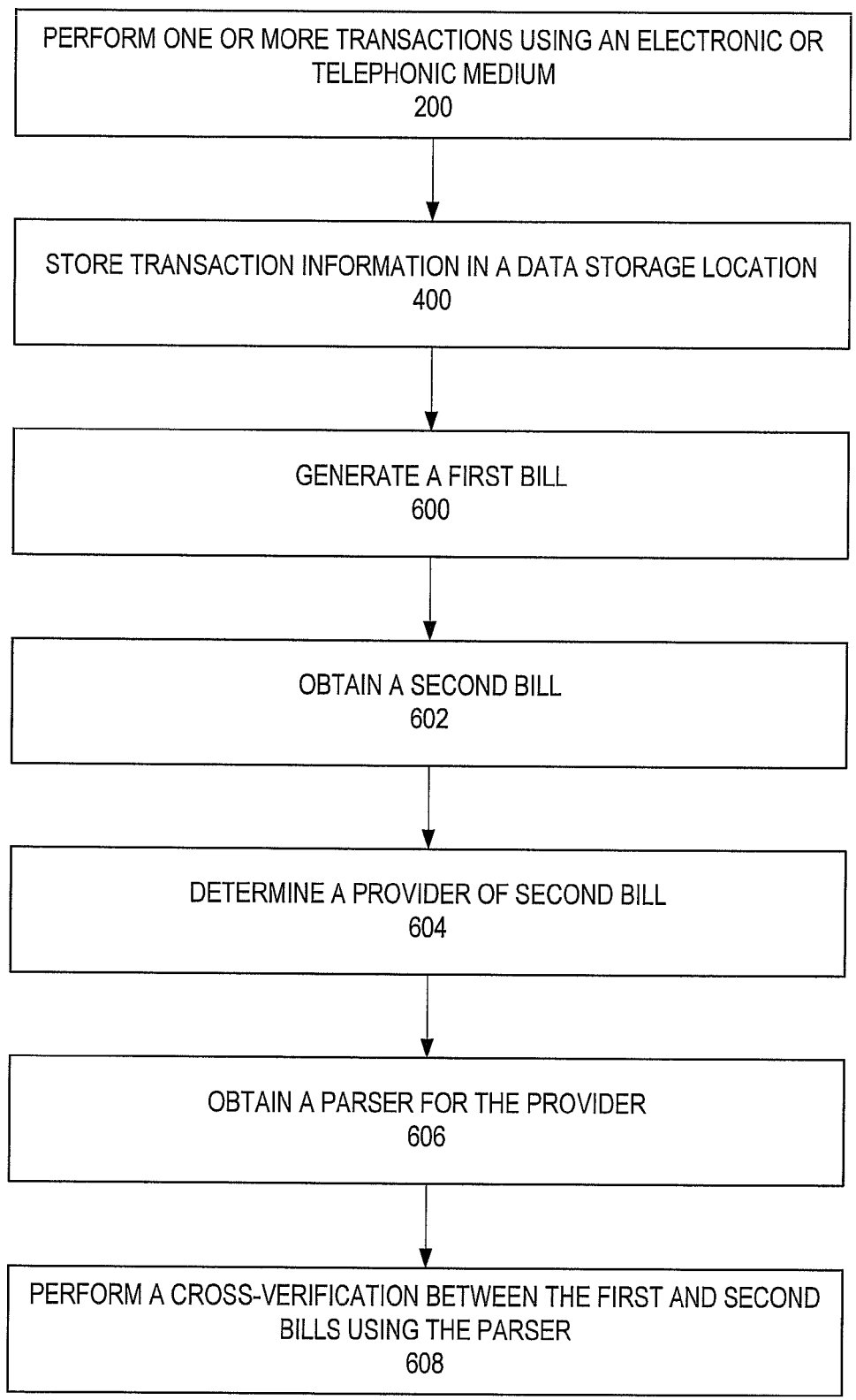
FIG. 6 is a diagram illustrating an example process for automated bill validation for electronic and telephonic transactions according to an embodiment of the present invention.

FIG. 6 is a diagram illustrating an example process for automated bill validation for electronic and telephonic transactions according to an embodiment of the present invention. This process can be carried out by the system 100 previously described with respect to FIG. 1. One or more transactions are performed using an electronic or telephonic medium at step 200. At step 400, the information related to the electronic or telephonic transactions is stored in a data storage location.

At step 600 a first bill is generated. At step 602 a second bill is obtained. The second bill may be obtained, for example, from the service provider. At step 604, the particular service provider who provided the second bill is determined. For example, the system may search through a list of service providers until the appropriate provider is obtained. Once the appropriate service provider is determined, a parser is obtained for that particular service provider at step 606. The parser may be designed, for example, to operate with a format that is unique to that particular service provider. Thereafter, the parser is used at step 608 to perform a cross-verification between the first and second bills. Therefore, the results of the cross-verification with the parser can be used to determine if the user was over billed for the services he or she used.

Figure 7:
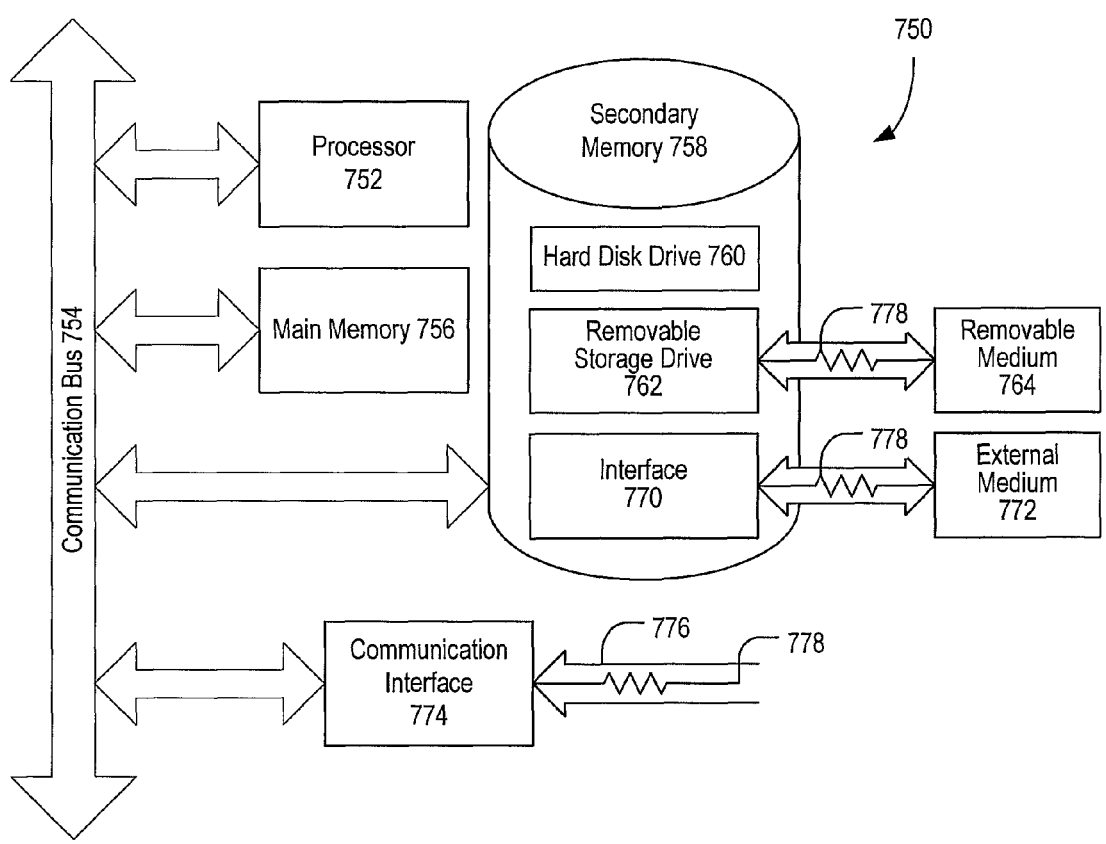
FIG. 7 is a block diagram illustrating an example computer system that may be used in connection with various embodiments described herein.

FIG. 7 is a block diagram illustrating an example computer system 750 that may be used in connection with various embodiments described herein. For example, the computer system 750 may be used in conjunction with the verification of information related to one or more transactions using an electronic or telephonic medium. The computer system 750 may also be used to send information associated with the transactions to a default location and to convert it to a standard format.

Tariff information associated with the transactions may also be stored in the data storage location through the use of the example computer system 750. The information may be used to generate a bill and a second bill may be obtained from a service provider. The first bill may be cross-verified against the second bill using the example computer system 750. However, other computer systems and/or architectures may be used, as will be clear to those skilled in the art.

The computer system 750 preferably includes one or more processors, such as processor 752. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 752.

The processor 752 is preferably connected to a communication bus 754. The communication bus 754 may include a data channel for facilitating information transfer between storage and other peripheral components of the computer system 750. The communication bus 754 further may provide a set of signals used for communication with the processor 752, including a data bus, address bus, and control bus (not shown). The communication bus 754 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 750 preferably includes a main memory 756 and may also include a secondary memory 758. The main memory 756 provides storage of instructions and data for programs executing on the processor 752. The main memory 756 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 758 may optionally include a hard disk drive 760 and/or a removable storage drive 762, for example a floppy disk drive, a magnetic tape drive, a compact disc ("CD") drive, a digital versatile disc ("DVD") drive, etc. The removable storage drive 762 reads from and/or writes to a removable storage medium 764 in a well-known manner. Removable storage medium 764 may be, for example, a floppy disk, magnetic tape, CD, DVD, etc.

The removable storage medium 764 is preferably a computer readable medium having stored thereon computer executable code (i.e., software) and/or data. The computer software or data stored on the removable storage medium 764 is read into the computer system 750 as electrical communication signals 778.

In alternative embodiments, secondary memory 758 may include other similar means for allowing computer programs or other data or instructions to be loaded into the computer system 750. Such means may include, for example, an external storage medium 772 and an interface 770. Examples of external storage medium 772 may include an external hard disk drive or an external optical drive, or and external magneto-optical drive.

Other examples of secondary memory 758 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 772 and interfaces 770, which allow software and data to be transferred from the removable storage unit 772 to the computer system 750.

Computer system 750 may also include a communication interface 774. The communication interface 774 allows software and data to be transferred between computer system 750 and external devices (e.g. printers), networks, or information sources. For example, computer software or executable code may be transferred to computer system 750 from a network server via communication interface 774. Examples of communication interface 774 include a modem, a network interface card ("NIC"), a communications port, a PCMCIA slot and card, an infrared interface, and an IEEE 1394 fire-wire, just to name a few.

Communication interface 774 preferably implements industry promulgated protocol standards, such as Ethernet IEEE 802 standards, Fiber Channel, digital subscriber line ("DSL"), asynchronous digital subscriber line ("ASDL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 774 are generally in the form of electrical communication signals 778. These signals 778 are preferably provided to communication interface 774 via a communication channel 776. Communication channel 776 carries signals 778 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 756 and/or the secondary memory 758. Computer programs can also be received via communication interface 774 and stored in the main memory 756 and/or the secondary memory 758. Such computer programs, when executed, enable the computer system 750 to perform the various functions of the present invention as previously described.

In this description, the term "computer readable medium" is used to refer to any media used to provide computer executable code (e.g., software and computer programs) to the computer system 750. Examples of these media include main memory 756, secondary memory 758 (including hard disk drive 760, removable storage medium 764, and external storage medium 772), and any peripheral device communicatively coupled with communication interface 774 (including a network information server or other network device). These computer readable mediums are means for providing executable code, programming instructions, and software to the computer system 750.

In an embodiment that is implemented using software, the software may be stored on a computer readable medium and loaded into computer system 750 by way of removable storage drive 762, interface 770, or communication interface 774. In such an embodiment, the software is loaded into the computer system 750 in the form of electrical communication signals 778. The software, when executed by the processor 752, preferably causes the processor 752 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A non-transitory computer readable medium having stored thereon one or more sequences of instructions for causing one or more microprocessors to perform the steps for verifying information related to at least one transaction using a medium, the steps comprising:
   sending transaction information associated with the at least one transaction to a data storage location;
   converting the transaction information to a standard format;
   storing the transaction information in the data storage location;
   storing tariff information associated with the transaction information in the data storage location;
   generating a first bill based on the tariff information and the transaction information;
   obtaining a second bill;
   determining a service provider associated with the second bill;
   obtaining a parser for the determined service provider from a plurality of parsers stored in the data storage location, wherein each of said plurality of parsers is adapted for use with a particular service provider; and
   using said determined service provider parser to verify the first bill with a second bill and identify any discrepancy between the first bill and the second bill.

2. The medium of claim 1 further comprising:
   periodically updating the tariff information in the data storage location.

3. The medium of claim 1 further comprising:
   notifying a user if there is an identified discrepancy between the first and the second bills.

4. The medium of claim 1 further comprising:
   determining whether a communicative coupling between the data storage location and the medium is disrupted;
   storing the transaction information in a local data storage location until the communicative coupling is restored; and
   uploading the transaction information from the local data storage location to the data storage location.

5. The medium of claim 1 wherein the transactions occur using one of a cellular phone, a land phone, a personal digital assistant, a computing device, a mart phone, or a smartcard.

6. The medium of claim 1 wherein the transactions include one of phone calls, purchases, bandwidth usages, or data usages.

7. The medium of claim 1 wherein the data storage location includes a database.

8. An information verification system related to at least one transaction using a medium comprising:
   a server comprising a data storage location where transaction information associated with the at least one transaction is sent and stored and where programmed modules including a bill generator module, a verification module, and a plurality of parser modules are stored;

wherein the bill generator module generates a first bill based on tariff information and the transaction information, wherein the transaction information comprises phone calls and the use of network bandwidth;

wherein the verification module obtains a second bill from a service provider and verifies the first bill with the second bill to identify any discrepancy between the first bill and the second bill; and wherein at least a portion of the plurality of parsers operate with a format that is specific to a particular service provider.

9. The system of claim 8 wherein the tariff information in the data storage location is updated when the tariff information changes.

10. The system of claim 8 further comprising:
a notification module stored in the data storage location at the server, wherein the notification module notifies a user if the verification module produces a discrepancy between the first and the second bills.

11. The system of claim 8 further comprising:
a communicative coupling between the data storage location and medium; and
a local data storage location for storing the transaction information if the communicative coupling is disrupted, wherein the transaction information is uploaded to the data storage location at the server when the communicative coupling is restored.

12. The system of claim 8, wherein the second bill is from a service provider.

13. The system of claim 8, wherein the transactions occur using one of a cellular phone, a land phone, a personal digital assistant, a computing device, a smart phone, or a smartcard.

14. The system of claim 8, wherein the transactions include purchases.

15. The system of claim 8 wherein the verification module selects one of the parsers to parse the first and the second bills.

16. The system of claim 8 wherein the data storage location includes a database.

17. The system of claim 8 further comprising a format conversion module stored in the data storage location at the server, wherein the format conversion module converts the transaction information and the tariff information to a standard format.

18. A computer implemented method for verifying information related to at least one transaction, where one or more processors are programmed to perform steps comprising:
identifying transaction information associated with at least one transaction;
converting the transaction information to a standard format;
storing the transaction information in a data storage location;
storing tariff information associated with the transaction information in the data storage location;
generating a first bill based on the tariff information and the transaction information, wherein the first bill covers a particular time period;
obtaining a second bill, wherein the second bill covers said particular time period;
determining a service provider associated with the second bill;
obtaining a parser for the determined service provider from a plurality of parsers stored in the data storage location, wherein each of said plurality of parsers is adapted for use with a particular service provider; and
using said determined service provider parser to verify the first bill with a second bill and identify any discrepancy between the first bill and the second bill.

* * * * *